(12) United States Patent
Fleming (10) Patent No.: US 10,500,715 B1
(45) Date of Patent: Dec. 10, 2019

(54) FOLDABLE REACHER GRABBER TOOL

(71) Applicant: James Fleming, Naples, FL (US)

(72) Inventor: Joseph Fleming, Naples, FL (US)

( * ) Notice: Subject to any disclaimer, the term of this patent is extended or adjusted under 35 U.S.C. 154(b) by 0 days.

(21) Appl. No.: 16/231,974

(22) Filed: Dec. 25, 2018

(51) Int. Cl.
*B25J 1/00* (2006.01)
*B25J 18/04* (2006.01)

(52) U.S. Cl.
CPC ............... *B25J 1/00* (2013.01); *B25J 18/04* (2013.01)

(58) Field of Classification Search
CPC ....... A01D 51/002; A47F 13/06; A63B 47/02; B25J 1/04; B25J 15/0206; B25J 15/022; B25J 15/0226; B25J 1/00; B25J 18/04; B65B 21/18
See application file for complete search history.

(56) References Cited

U.S. PATENT DOCUMENTS

| | | | | |
|---|---|---|---|---|
| 6,848,731 B2* | 2/2005 | Khubani | ................. | B25G 1/06 16/328 |
| 7,677,619 B2* | 3/2010 | Hutchings | ................. | B25J 1/02 294/105 |
| 7,980,609 B2* | 7/2011 | Khubani | ................... | B25J 1/04 294/111 |
| 8,807,615 B2* | 8/2014 | Kovarik | ................. | A47F 13/06 294/111 |
| 9,592,066 B2* | 3/2017 | Kovarik | ................. | A61C 1/185 |
| 2010/0096866 A1* | 4/2010 | Flinn | ..................... | E01H 1/1206 294/1.4 |

* cited by examiner

*Primary Examiner* — Stephen A Vu
(74) *Attorney, Agent, or Firm* — Wayne V. Harper (57) ABSTRACT

An object-picking tool for picking objects from a distance includes an elongated arm and a gripping device. The elongated arm includes a distal arm and a proximal arm. Further the gripping device is provided at a distal end of the distal arm. The object-picking tool also includes a handle present on a proximal end of the proximal arm. Further, a controlling device is present on handle for controlling the gripping device. The object-picking tool further includes a folding and locking device having a button. The button, when pushed inside locks the distal arm and the proximal arm. The button when pushed back again or release unlock the distal arm and the proximal arm for folding.

6 Claims, 6 Drawing Sheets

FOLDABLE REACHER GRABBER TOOL

TECHNICAL FIELD

The presently disclosed subject matter generally relates to the field of tools for picking objects from remote distances. Particularly, the present subject matter relates to a foldable reacher grabber tool.

BACKGROUND

There are a wide variety of tools designed for picking up objects or manipulating objects from a distance. One common application for such tools is to pick-up debris or rubbish from ground etc. for subsequent disposal. An existing tool includes an elongate handle for allowing manipulation of an object without the need to bend over or to directly handle the object from a distance. Such tools may also be used in household applications for retrieval of objects from under the furniture or from high shelves, for changing light bulbs from recessed lighting fixtures. Further, individuals with physical disability that may impede their ability to bend over and reach the ground may use such tools. Other similar tool includes toy devices that operate in a similar manner and perform a similar function as a pick-up tool. The tools for picking up objects usually have a long arm and this increases the size of the tool. The pick up tool having long arm requires more storage space.

In light of above discussion, there exists need for a compact tool for picking the objects from a remote distance that is easy to store and carry.

SUMMARY

The main objective of the present disclosure is to provide a compact tool that is easy to store and carry for picking the objects from a remote distance.

The present disclosure provides a reacher grabber tool or an object-picking tool for picking objects from a remote distance. The reacher grabber tool includes a folding device located in middle of an arm. The folding device is configured to move on its axis for folding the reacher grabber tool.

The present disclosure provides a foldable reacher grabber tool comprising an elongated rod having a distal arm and a proximal arm. The distal arm and the proximal arm are connected to each other via a folding device or mechanism comprising a push button. The push button is pushed in to lock the distal arm and the proximal arm.

The present disclosure provides a foldable tool for picking objects from the ground conveniently.

The present disclosure provides a foldable tool comprising an elongated arm including two arms for picking objects from the ground conveniently. The tool comprises a button configured to free the arms and fold the tool. The user can push the button, locking pin locks the arms and button shifts at opposite side and now for unlocking the user have to push the opposite side button so the tool includes a kind of manual locking system.

The present disclosure provides a folding device for a reacher grabber tool. The reacher grabber tool includes an elongated arm. The folding device is located at a center of the elongated arm dividing the arm into two parts i.e. a distal arm and a proximal arm. The folding device includes a button that can be pushed to lock the distal arm and the proximal arm into place and then when the button shifts to the other side of the folding device, the button is pushed back to unlock the distal arm and the proximal arm. When the button is pushed back then the distal arm and the proximal arm can be folded to reduce the size of the reacher grabber tool. The reacher grabber tool includes a gripping device at a distal end of the distal arm for picking objects from the ground. The gripping device may be controlled via a handheld controlling device located a proximal end of the proximal arm. A user can close or open the gripping device by using the handheld controlling device for picking and releasing the objects from a distance.

The present disclosure provides an object-picking tool that has gripping device located on a distal end of a distal arm, a handle on a proximal end of proximal rod, a controlling device on the handle to control the engagement elements, and a linking means between the controlling device and the gripping elements to control the engagement device. The distal and proximal arms are connected together by a folding and locking device. A folding and locking device includes a button for locking or freeing the distal and proximal arms. The button can be pushed to lock the distal and proximal arms into place and then when the button shifts to the other side of the folding and locking device, the button is pushed back to unlock the distal and proximal arms. When the button is pushed back then the distal arm and the proximal arm can be folded to reduce the size of the object-picking tool.

An embodiment of the present disclosure provides an object-picking tool for picking objects from a distance. The tool includes an elongated arm comprising a distal arm and a proximal arm. The tool further includes a gripping device at a distal end of the distal arm. The tool also includes a handle present on a proximal end of the proximal arm. The tool further includes a controlling device present on handle for controlling the gripping device. The tool further includes a folding and locking device comprising a button that is when pushed inside locks the distal arm and the proximal arm, wherein the button is pushed back again for unlocking the distal arm and the proximal arm for folding.

Another embodiment of the present disclosure provides a foldable reacher grabber tool for picking objects from a distance. The tool includes an elongated arm comprising a distal arm and a proximal arm. The tool further includes a gripping device at a distal end of the distal arm. The tool also includes a handle present on a proximal end of the proximal arm. The tool further includes a controlling device present on handle for controlling the gripping device. The tool further includes a folding and locking device comprising a button that is when pushed inside locks the distal arm and the proximal arm, wherein the button is pushed back again for unlocking the distal arm and the proximal arm for folding.

Yet another embodiment of the present disclosure provides a folding and locking mechanism for use in a reacher grabber tool. The folding and locking mechanism includes a button configured to be pushed inside for locking a distal arm and a proximal arm of the reacher grabber tool, wherein the button is pushed back again for unlocking the distal arm and the proximal arm.

According to an embodiment of the present disclosure, a user manipulates the controlling device to operate the gripping device located on a distal end of the elongated arm.

According to an aspect of the present disclosure, the gripping device includes elements comprising at least one of tongs, blades, cups, scoops, arms, claws, and calipers.

According to an aspect of the present disclosure, the gripping device is linked to the controlling device via an internal linkage.

According to an aspect of the present disclosure, the controlling device includes a lever, when the user pulls the lever then the internal linkage draws together the elements of the gripping device. The elements may be biased apart by spring like structures.

According to an aspect of the present disclosure, the controlling device is the trigger mechanism that pulls the wire straight back and not downward so the wire does not rub against the plastic edge preventing the wire from fraying.

Other and further aspects and features of the disclosure will be evident from reading the following detailed description of the embodiments, which are intended to illustrate, not limit, the present disclosure.

BRIEF DESCRIPTION OF THE DRAWINGS

The illustrated embodiments of the disclosed subject matter will be best understood by reference to the drawings, wherein like parts are designated by like numerals throughout. The following description is intended only by way of example, and simply illustrates certain selected embodiments of devices, systems, and processes that are consistent with the disclosed subject matter as claimed herein.

DETAILED DESCRIPTION

The following detailed description is made with reference to the figures. Exemplary embodiments are described to illustrate the disclosure, not to limit its scope, which is defined by the claims. Those of ordinary skill in the art will recognize a number of equivalent variations in the description that follows.

Reference throughout this specification to "a select embodiment," "one embodiment," or "an embodiment" means that a particular feature, structure, or characteristic described in connection with the embodiment is included in at least one embodiment of the disclosed subject matter. Thus, appearances of the phrases "a select embodiment," "in one embodiment," or "in an embodiment" in various places throughout this specification are not necessarily referring to the same embodiment.

Furthermore, the described features, structures, or characteristics may be combined in any suitable manner in one or more embodiments. In the following description, numerous specific details are provided, to provide a thorough understanding of embodiments of the disclosed subject matter. One skilled in the relevant art will recognize, however, that the disclosed subject matter can be practiced without one or more of the specific details, or with other methods, components, materials, etc. In other instances, well-known structures, materials, or operations are not shown or described in detail to avoid obscuring aspects of the disclosed subject matter.

Figure 1A:
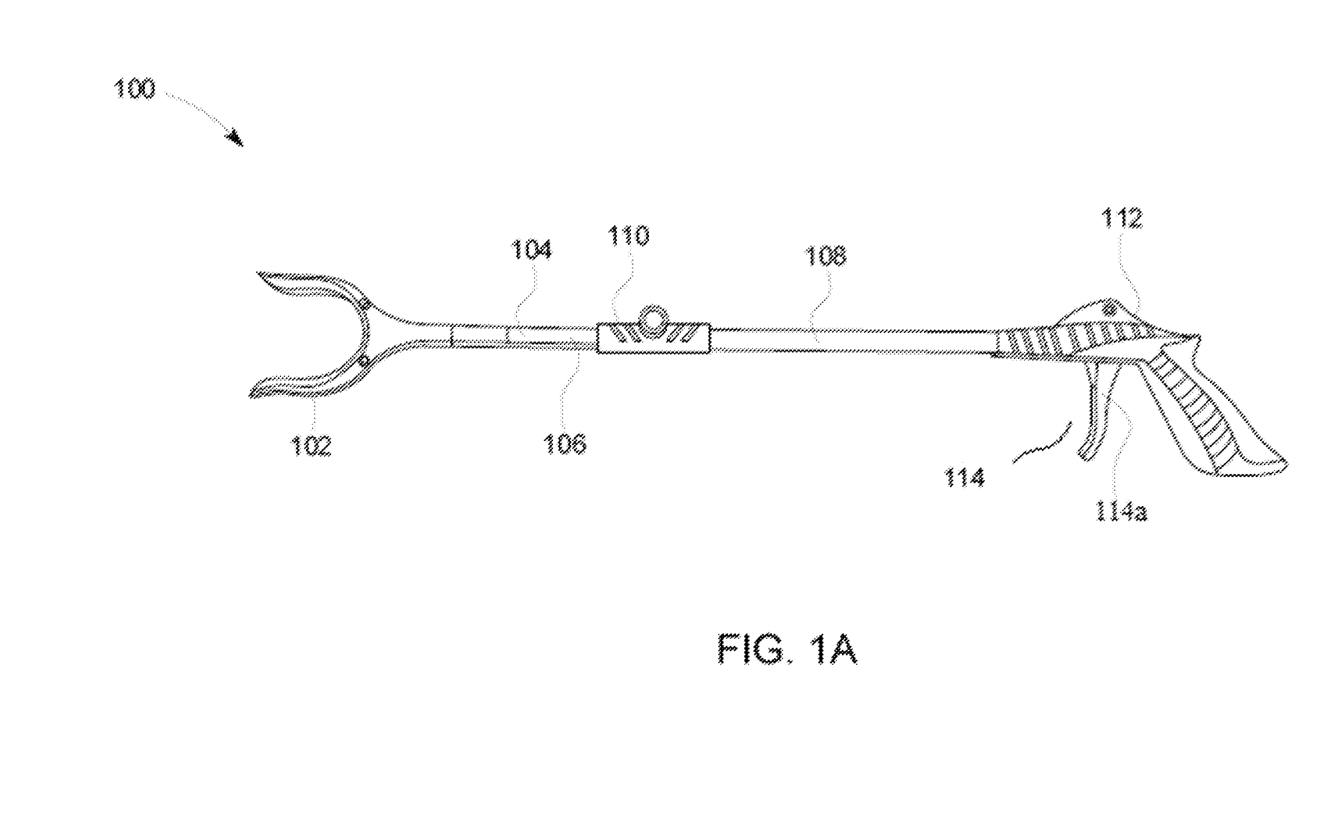
FIG. 1A illustrates an exemplary object-picking tool in an open configuration, in accordance with an embodiment of the present disclosure.

FIG. 1A illustrates an exemplary object-picking tool 100 in an open configuration, in accordance with an embodiment of the present disclosure. As shown, the object-picking tool 100 includes an elongated arm 104 comprising two parts i.e. a distal arm 106 and a proximal arm 108. Hereinafter, the object-picking tool 100 may also be referred as a reacher grabber tool or a foldable reacher grabber tool, without change in its meaning.

Further, the object-picking tool 100 includes a gripping device 102 at a distal end of the distal arm 106. In some embodiments, the gripping device 102 includes one or more elements comprising at least one of tongs, blades, cups, scoops, arms, claws, calipers, and so forth. In an embodiment, the one or more elements are opposite engagement cups, it can also be contemplated that other elements may also be used and that may depend on the intended application of the object-picking tool 100.

A handle 112 is also present on a proximal end of the proximal arm 108 of the object-picking tool 100. A user can hold the object-picking tool 100 by holding the handle 112. The object-picking tool 100 also includes a controlling device 114 present on the handle 112 for controlling the gripping device 102. In an embodiment of the present disclosure, the user manipulates the controlling device 114 to operate the gripping device 102 located on the distal end of the elongated arm 104. The controlling device 114 may be in form of a lever or a trigger that the user can manipulate for manipulating the elements of the gripping device 102. Further, the gripping device 102 is linked or connected to the controlling device 114 via suitable linking structure like a wire (not seen in drawings as the linking structure is inside of the elongated arm 104) etc. The controlling device 114 is a trigger mechanism that pulls the wire straight back and not downward, so the wire does not rub against the plastic edge preventing the wire from fraying.

Though the controlling device 114 is shown as a trigger (114a) that the user can engage using one or more fingers, but a person skilled in the art will understand that alternative arrangements of the controlling device 114 may also be possible. For example, the trigger may be manipulated by a user's single finger or thumb. In some embodiments, the controlling device 114 may be displaced on a rear side of the handle 112 that may remain stationary. The handle 112 is ergonomically designed so that the user hand can form a grip with the handle 112 for holding the object-picking tool.

Further, the object-picking tool 100 also includes a folding and locking device 110 including a button that is when pushed inside locks the distal arm 106 and the proximal arm 108. The button is discussed in detail with reference to FIGS. 2A-2F. Further, the button 202 can be released for unlocking (or releasing) the distal arm 106 and the proximal arm 108 so that the object-picking tool 100 can be folded. The distal arm 106 and the proximal arm 108 are connected to each other via the folding and locking device 110. Further, the folding and locking device 110 enables the object-picking device 100 to be folded.

Figure 1B:
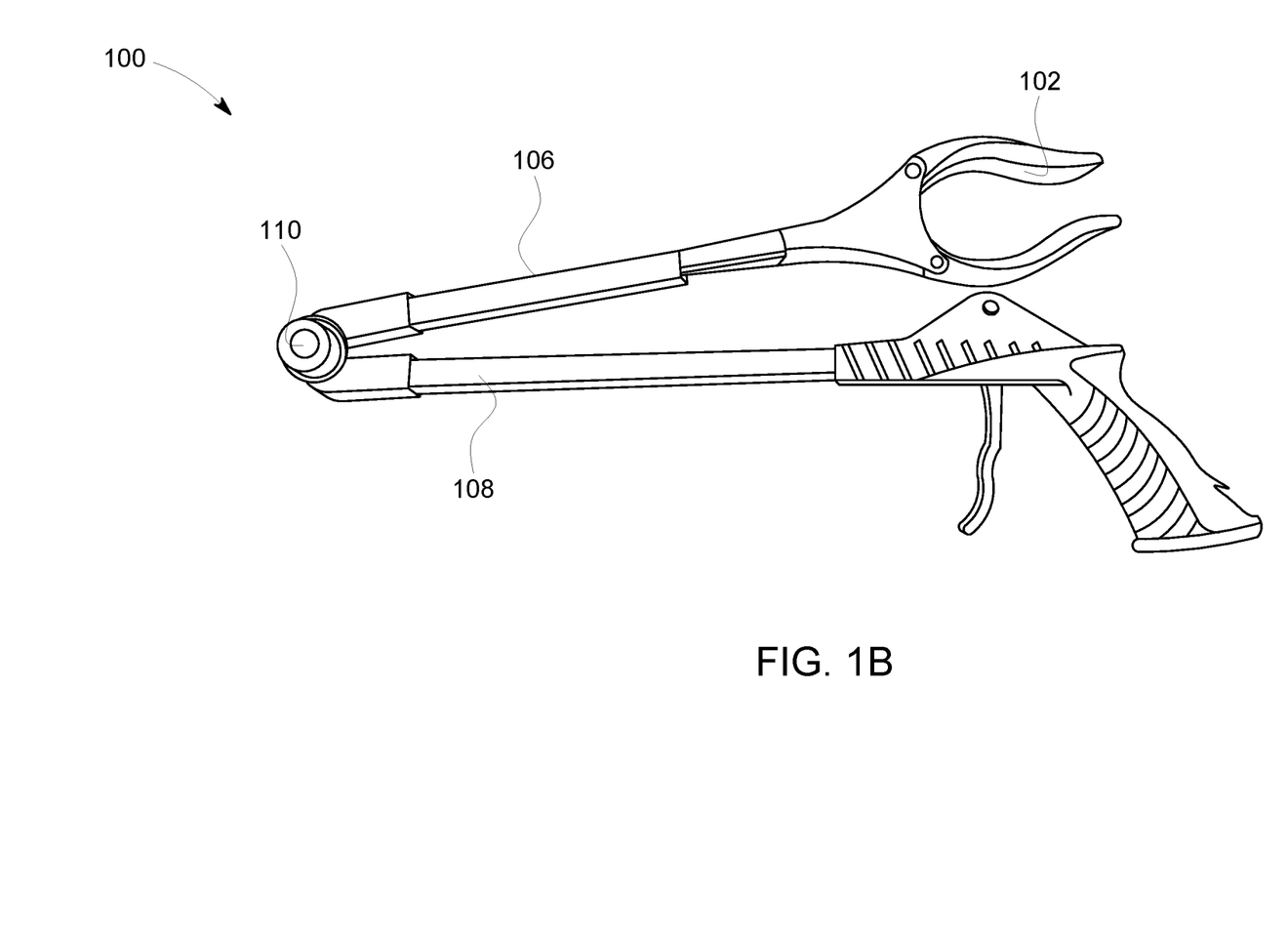
FIG. 1B illustrates an exemplary object-picking tool in a closed or folded configuration, in accordance with an embodiment of the present disclosure.

FIG. 1B illustrates the exemplary object-picking tool 100 in a closed or folded configuration, in accordance with an embodiment of the present disclosure. The button is configured to be pushed inside for locking the distal arm 106 and the proximal arm 108 of the reacher grabber tool 100. Further, the user pushes back the button for unlocking the distal arm and the proximal arm.

Figure 2A:
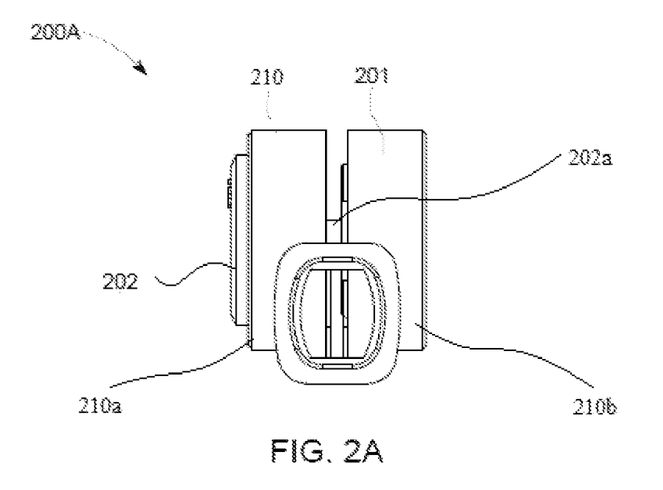
FIG. 2A-2G illustrates different views of an exemplary folding and locking device of an object-picking tool of FIGS. 1A-1B.

FIG. 2A-2G illustrates different views 200A-200G of an exemplary folding and locking device 201 of an object-picking tool 100 of FIGS. 1A-1B. FIG. 2A shows a side view 200A of a folding and locking device 201 of the object-picking tool 100. The folding and locking device 201 (or 110) includes a locking unit 210 having a first member 210a and a second member 210b, each defining a cavity 212 to accommodate a button 202 that a user can push in or push it back in the cavity 212 for manipulating the distal arm 106 and the proximal arm 108 of the object-picking tool 100.

Figure 2B:
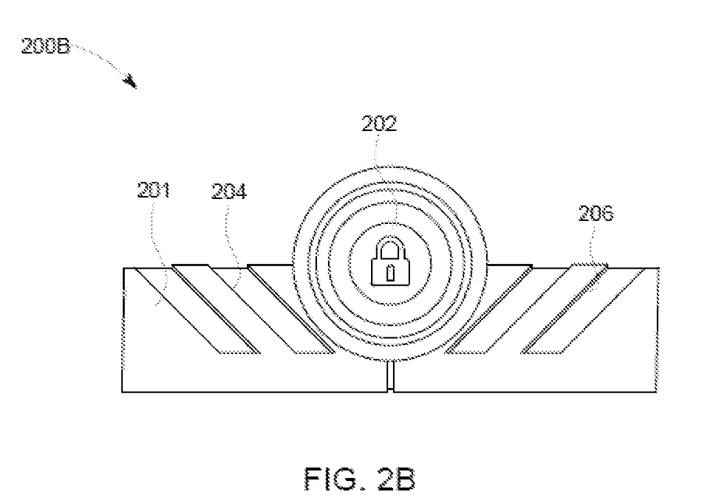

FIG. 2B illustrates a front view 200B of the folding and locking device 201 of the object-picking tool 100. As shown the folding and locking device 201 of the object-picking tool 100 includes three parts, the button 202, a left part (or a first part) 204, and a right part (or a second part) 206. The distal arm 106 is connected to the proximal arm 108 via the folding and locking device 201. The distal arm 106 is connected to the left part 204 of the folding and locking device 201. Similarly, the proximal arm 108 is connected to the right part 206 of the folding and locking device 201.

Figure 2C:
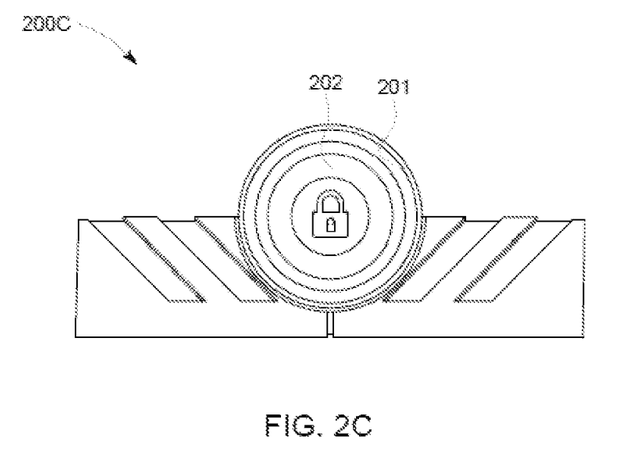

FIG. 2C is another front view 200C of the folding and locking device 201 showing the button 202 in pushed in configuration. The button 202 is pushed inside for locking the distal arm 106 and the proximal arm 108 of the object-picking tool 100; this in turn may restrict free movement of the proximal arm 108 and the distal arm 106.

Figure 2D:
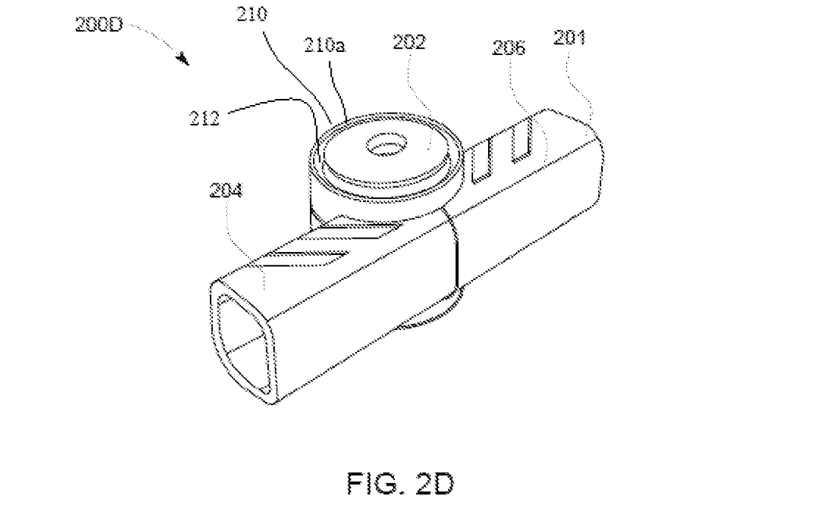
Figure 2E:
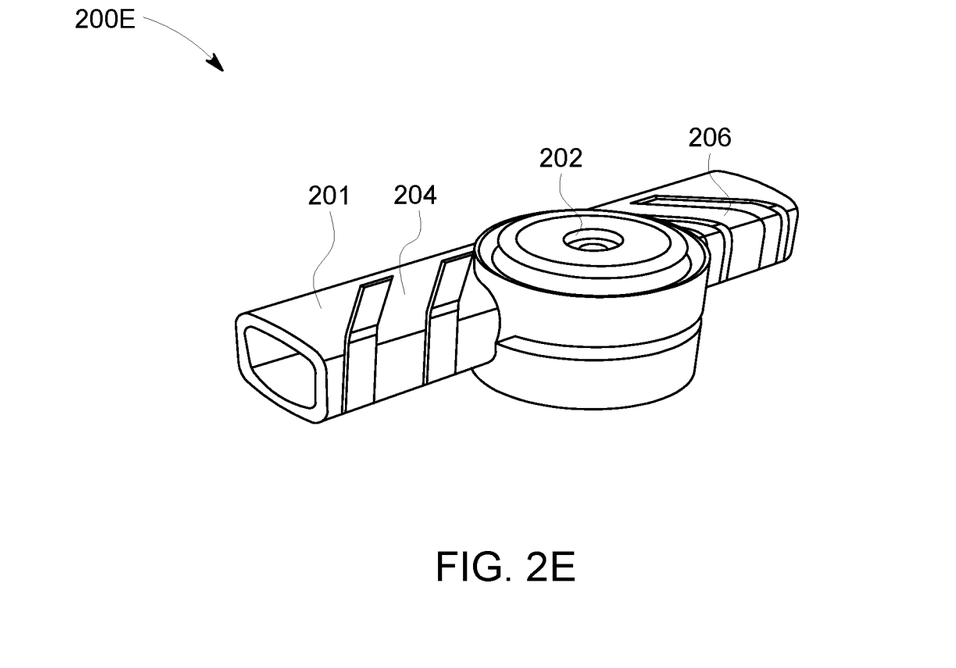

FIG. 2D shows another view 200D of the folding and locking device 201 from a side angle. Further, the button 202 can be released for unlocking (or releasing) the distal arm 106 and the proximal arm 108 so that the object-picking tool 100 can be folded. The distal arm 106 and the proximal arm 108 are connected to each other via the folding and locking device 110. Further, the folding and locking device 110 enables the object-picking tool/device 100 to be folded. The object picking tool 100 becomes compact when folded so its easy to store and convenient to carry. FIG. 2E illustrates a zoomed view 200E of the folding and locking device 201.

Figure 2F:
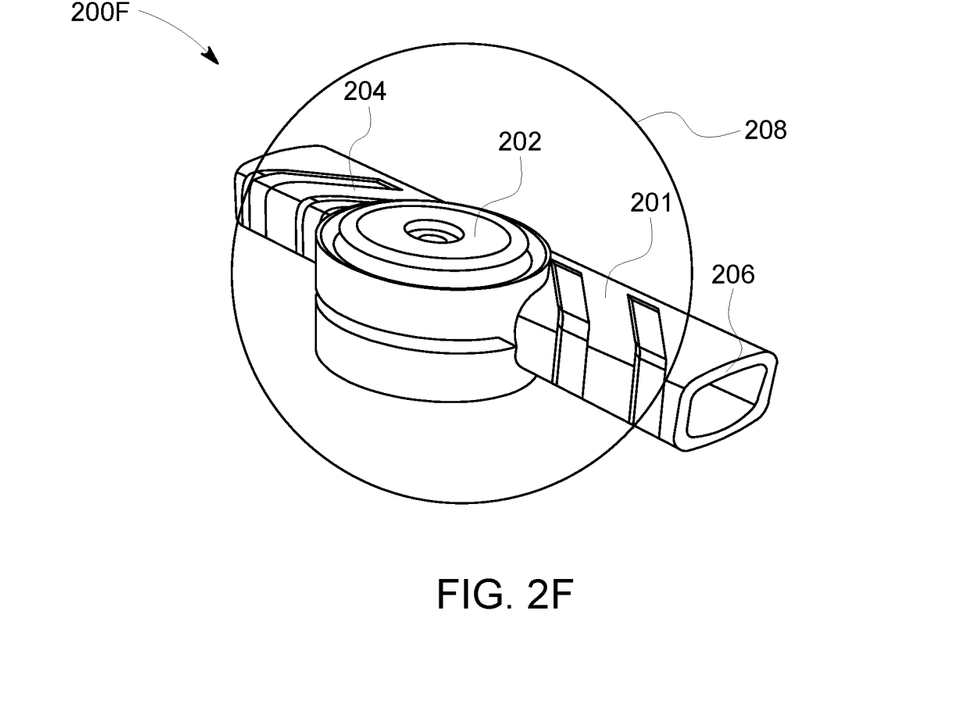
Figure 2G:
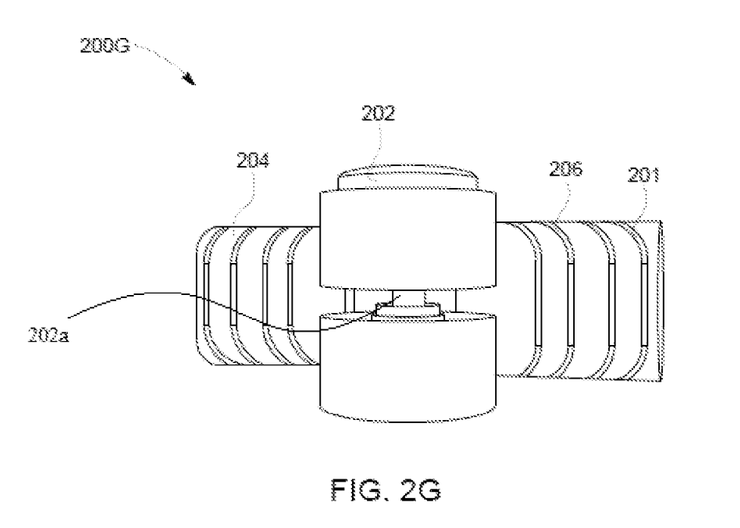

Turning now to FIG. 2F, a view 200F illustrates the button 202 in released or not pushed in configuration. When the button 202 is not pushed inside, then the left part 204 connected to the distal arm 106 and/or the right part 206 connected to the proximal arm 108 are free to move along an axis 208 so as to fold the object-picking tool 100. The folding and locking device 201 can be manually operated by the user by pushing or pushing back for locking or unlocking the distal and proximal arms 106-108 of the object-picking tool 100. FIG. 2G illustrates a top view 200G of the folding and locking device 201.

Figure 3:
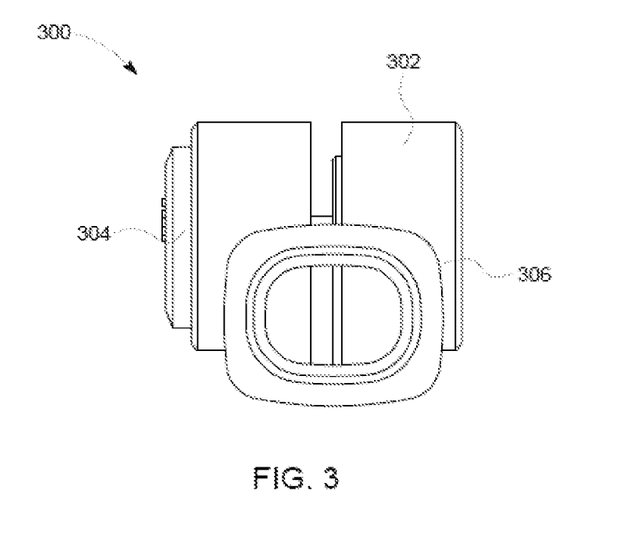
FIG. 3 illustrates functioning of an exemplary folding and locking device, in accordance with an embodiment of the present disclosure.

FIG. 3, a view 300 illustrates functioning of an exemplary folding and locking device 302, in accordance with an embodiment of the present disclosure. As shown, the folding and locking device 302 includes a button 304 that is when pressed/pushed inside locks the distal arm 106 and the proximal arm 108 of a reacher grabber tool like the object picking tool 100 as discussed with reference to FIG. 1A. Further, when the button 304 is released or pushed back then the distal arm 106 and the proximal arm 108 are unlocked and are free to move along an angular axis 208 as discussed with reference to FIG. 2F. The distal arm 106 and the proximal arm 108 are connected to each other via the folding and locking device 302. Further, the folding and locking device 302 enables the reacher grabber tool to be folded. As shown in the FIG. 3, the user pushes the button 304 to lock the distal and proximal arms 106-108 into place and the button 304 shifts to other side 306 of the folding and locking device 302. The user can push the button 304 back to unlock the distal and proximal arms 106-108.

As mentioned in FIG. 3 the folding and locking device 302 is using the push button mechanism for locking the distal and proximal arms 106-108. When the user push the button 304 then locking pin 202a locks the distal and proximal arms 106-108, and the button 304 shifts at the opposite side 306 and now for unlocking the distal and proximal arms 106-108, the user have to push the opposite side button 304 so it's kind of manual locking system. In some embodiments, the button can be pushed back from the opposite side 306.

The disclosed reacher grabber tool comprises a folding and locking device including a button that can be manually manipulated by a user for folding the reacher grabber tool.

The disclosed reacher grabber tool is foldable and easy to carry and store.

The disclosed reacher grabber tool/object-picking tool can be used in homes or outdoors for picking and grabbing objects from a distance like ground or shelf.

The disclosed reacher grabber tool/object-picking tool may also be used in household applications for retrieval of objects from under the furniture or from high shelves, for changing light bulbs from recessed lighting fixtures.

The disclosed reacher grabber tool/object-picking tool may be used for picking garbage from the ground without leaning forward towards the ground.

According to an embodiment of the present disclosure, a user manipulates the controlling device of the object-picking tool to operate the gripping device located on a distal end of the elongated arm of the object-picking tool.

According to an aspect of the present disclosure, the gripping device of the object-picking tool includes elements comprising at least one of tongs, blades, cups, scoops, arms, claws, and calipers.

According to an aspect of the present disclosure, the gripping device of the object-picking tool is linked to the controlling device via an internal linkage like a wire. The controlling device being the trigger mechanism that pulls the wire straight back and not downward so the wire does not rub against the plastic edge preventing the wire from fraying.

According to an aspect of the present disclosure, the controlling device includes a lever, when the user pulls the lever then the internal linkage (i.e. the wire) draws together the elements of the gripping device. The elements may be biased apart by spring like structures. The controlling device is a trigger mechanism that pulls the wire straight back and not downward so the wire does not rub against the plastic edge preventing the wire from fraying.

It will be appreciated that several of the above-disclosed and other features and functions, or alternatives thereof, may be desirably combined into many other different systems or applications. Various presently unforeseen or unanticipated alternatives, modifications, variations, or improvements therein may be subsequently made by those skilled in the art, which are also intended to be encompassed by the following claims.

The above description does not provide specific details of manufacture or design of the various components. Those of skill in the art are familiar with such details, and unless departures from those techniques are set out, techniques, known, related art or later developed designs and materials should be employed. Those in the art are capable of choosing suitable manufacturing and design details.

The terminology used herein is for the purpose of describing particular embodiments only and is not intended to be limiting of the disclosure. It will be appreciated that several of the above disclosed and other features and functions, or alternatives thereof, may be combined into other systems, methods, or applications. Various presently unforeseen or unanticipated alternatives, modifications, variations, or improvements therein may subsequently be made by those skilled in the art without departing from the scope of the present disclosure as encompassed by the following claims.

What is claimed is:

1. An object-picking tool for picking objects from a distance, comprising:
   an elongated arm comprising a distal arm and a proximal arm;
   a gripping device at a distal end of the distal arm;
   a handle present on a proximal end of the proximal arm;
   a controlling device present on handle for controlling the gripping device; and
   a folding and locking device comprising:
      a locking unit having a first member and a second member connected to each other, the locking unit defines a cavity extending from the first member to the second member;
      a first part extending from the locking unit, the first member having a unitary configuration to define a first hollow profile, wherein the first hollow profile receives one end of the distal arm;
      a second part extending from the locking unit in opposite direction of the first part, the second part having a unitary configuration to define a second hollow profile, wherein the second hollow profile receives one end of the proximal arm; and
      a button having a locking pin, the button disposed within the cavity in the first member along with the locking pin, and the button along with the locking pin adapted to extend in the cavity up to the second member of the locking unit, wherein the button when pushed inside, the locking pin engages with the proximal arm and the proximal arm to lock the distal arm and the proximal arm, wherein the button when pushed back again, the locking pin disengages with the proximal arm and the proximal arm unlock the distal arm and the proximal arm for folding.

2. The object-picking tool as claimed in claim 1, wherein the distal arm and the proximal arm free to move along an axis with respect to each other when coupled via the folding and locking device.

3. The object-picking tool as claimed in claim 1, wherein the gripping device gripping a predefined object.

4. The object-picking tool as claimed in claim 1, wherein the one or more elements comprises at least one of tongs, blades, cups, scoops, arms, claws, calipers, and so forth.

5. The object-picking tool as claimed in claim 1, wherein the controlling device comprises a trigger mechanism having:
   a trigger coupled along the handle to manipulate the gripping device; and
   a linking structure coupled to extend between the trigger and the gripping device,
   wherein the trigger mechanism, using the trigger, pulls the wire back and forth to manipulate the gripping device.

6. A folding and locking mechanism for use in an object-picking tool having a distal arm and a proximal arm, the folding and locking mechanism comprising:
   a locking unit having a first member and a second member connected to each other, the locking unit defines a cavity extending from the first member to the second member;
   a first part extending from the locking unit, the first member having a unitary configuration to define a first hollow profile, wherein the first hollow profile receives one end of the distal arm;
   a second part extending from the locking unit in opposite direction of the first part, the second part having a unitary configuration to define a second hollow profile, wherein the second hollow profile receives one end of the proximal arm; and
   a button having a locking pin, the button disposed within the cavity in the first member along with the locking pin, and the button along with the locking pin adapted to extend in the cavity up to the second member of the locking unit, wherein the button is configured to be pushed inside to enable the locking pin for locking the distal arm and the proximal arm of the reacher grabber tool, wherein the button is configured to be pushed again to enable the locking pin be released for unlocking the distal arm and the proximal arm.

* * * * *